US008826015B2

(12) United States Patent
Lakshminarayanan et al.

(10) Patent No.: US 8,826,015 B2
(45) Date of Patent: Sep. 2, 2014

(54) PORTABLE SYSTEM AND METHOD FOR REMOTELY ACCESSING DATA (75) Inventors: Anantharaman Lakshminarayanan, Singapore (SG); Kalyan Takru, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 470 days.

(21) Appl. No.: 12/988,613

(22) PCT Filed: Apr. 21, 2008

(86) PCT No.: PCT/SG2008/000130
§ 371 (c)(1),
(2), (4) Date: Oct. 19, 2010

(87) PCT Pub. No.: WO2009/131538
PCT Pub. Date: Oct. 29, 2009

(65) Prior Publication Data
US 2011/0040971 A1 Feb. 17, 2011

(51) Int. Cl.
*H04L 9/32* (2006.01)
*G06F 21/62* (2013.01)
*G06F 21/79* (2013.01)
*G06F 21/44* (2013.01)
*H04L 29/06* (2006.01)

(52) U.S. Cl.
CPC ............ *G06F 21/79* (2013.01); *G06F 21/6263* (2013.01); *H04L 63/0869* (2013.01); *H04L 63/0853* (2013.01); *G06F 2221/2153* (2013.01); *H04L 63/0876* (2013.01); *G06F 21/445* (2013.01)
USPC ........... 713/168; 713/169; 713/171; 713/186; 726/9; 726/22; 726/25; 380/278; 705/12; 705/1

(58) Field of Classification Search
CPC ... H04L 9/0656; H04L 9/3202; H04L 9/0816; H04L 63/067; H04L 63/12; H04L 9/3234; G06F 21/85
USPC .................. 713/175, 168–171; 726/9, 22–25; 380/278; 705/12
See application file for complete search history.

(56) References Cited

U.S. PATENT DOCUMENTS 6,044,349 A * 3/2000 Tolopka et al. ................. 705/1.1
6,170,067 B1 * 1/2001 Liu et al. ......................... 714/48

(Continued)

FOREIGN PATENT DOCUMENTS

EP       1 881 663 A1    1/2008
WO    WO 2008/005765 A2    1/2008

OTHER PUBLICATIONS

International Search Report, dated Nov. 13, 2008, corresponding to PCT/SG2008/000130.

*Primary Examiner* — Dede Zecher
*Assistant Examiner* — Viral Lakhia
(74) *Attorney, Agent, or Firm* — Christie, Parker & Hale, LLP (57) ABSTRACT

Embodiments of the present invention provide a portable system and method for accessing data remotely. The system and method include a first module and a second module, each of the modules being associated with the host system, wherein the first module is capable of being connected to the host system and the second module, and the second module is capable of being connected to the remote system to establish a secure communication channel between the first and second modules across the data link to access the data.

17 Claims, 7 Drawing Sheets (56) References Cited

U.S. PATENT DOCUMENTS

| | | | |
|---|---|---|---|
| 7,152,160 B2* | 12/2006 | Lantto et al. | 713/168 |
| 7,418,401 B2* | 8/2008 | Bogasky et al. | 705/12 |
| 7,418,592 B1* | 8/2008 | Zajkowski et al. | 713/156 |
| 7,451,479 B2* | 11/2008 | Yeh et al. | 726/2 |
| 7,478,427 B2* | 1/2009 | Mukherjee et al. | 726/15 |
| 7,793,340 B2* | 9/2010 | Kiester et al. | 726/4 |
| 7,978,714 B2* | 7/2011 | Rao et al. | 370/401 |
| 8,074,276 B1* | 12/2011 | Beloussov et al. | 726/22 |
| 8,127,143 B2* | 2/2012 | Abdallah et al. | 713/186 |
| 8,301,887 B2* | 10/2012 | Kelly et al. | 713/169 |
| 8,522,028 B2* | 8/2013 | Brique et al. | 713/171 |
| 8,667,265 B1* | 3/2014 | Hamlet et al. | 713/150 |
| 2006/0037071 A1* | 2/2006 | Rao et al. | 726/13 |
| 2007/0016941 A1* | 1/2007 | Gonzalez et al. | 726/9 |
| 2007/0022469 A1* | 1/2007 | Cooper et al. | 726/3 |
| 2007/0156850 A1* | 7/2007 | Corrion | 709/219 |
| 2008/0281953 A1* | 11/2008 | Blaisdell | 709/223 |
| 2009/0006232 A1* | 1/2009 | Gallagher et al. | 705/35 |
| 2009/0010503 A1* | 1/2009 | Mathiassen et al. | 382/125 |
| 2009/0052675 A1* | 2/2009 | Levow et al. | 380/278 |
| 2009/0063869 A1* | 3/2009 | Kohavi et al. | 713/189 |
| 2012/0297205 A1* | 11/2012 | Yuen et al. | 713/193 |

\* cited by examiner

PORTABLE SYSTEM AND METHOD FOR REMOTELY ACCESSING DATA

CROSS-REFERENCE TO RELATED APPLICATION:

This application is a National Phase Patent Application and claims the priority of International Application Ser. No. PCT/SG2008/000130, filed on Apr. 21, 2008.

FIELD OF INVENTION

Embodiments of the present invention relate to a portable system and method for accessing data remotely.

BACKGROUND

Computer users keep large amounts of data, such as personal information, financial information, and proprietary business data, on their computers. Users often consider much of that data private, i.e., they do not wish others to access it. One way to control access to the data is to control access to the computer itself. However, as users travel, they may wish to access some of that private data remotely. They wish such remote access to be as secure as possible so that the data is not viewed by anyone who has not been granted specific access. Currently, there are various systems and methods in place to allow a user to remotely and securely access data residing on one device from another device in a remote location.

For example, a user can store and access data using a variety of portable storage devices/media. Such devices can include USB thumb-drives, storage cards, portable hard disk drives, CD-ROMs, DVD-ROMs etc. However, storing the desired files on a portable device requires the user to synchronize any changes that occur, since changes made to a file on the portable device will not be reflected in the original file.

Additionally, if the portable device is lost or stolen, the data may become available to unauthorized users. It is possible to protect the data using various techniques. One technique is to encrypt the data on these devices and use a password to access the data. In order to be secure from decryption attacks, the passwords must be of a certain length and contain both numeric and alphabetic characters. However, the use of passwords requires user intervention for set-up. If the user forgets or misplaces the passwords, he will not be able to access the data thus protected. If the data is encrypted on the storage device using the password, it is possible that a user may not be able to access the data at all unless unencrypted copies of the data exist. Additionally, if a password is lost or stolen, the user must revoke the old password and establish a new one. This is onerous for many users.

Further, passwords may be easily bypassed by a determined attacker. For example, the passwords that are generated by the user at the computer keyboard can be tracked by key-logger software resident on the user's computer. The user may not even know that such software has been installed on their system. Given the problems described above, the use of passwords as a security measure for protecting data is thus not an optimal solution.

Alternate systems are also known for securing data. For example, biometric authentication verifies a user by capturing some physical characteristic, such as face recognition, voice recognition, fingerprinting, iris scanning etc, then using the captured characteristic to authenticate the user. Biometric authentication is rather secure, as the user must be present to access the data. However, this can be inconvenient, as the user who has set up the biometric identification must be present to allow other users to access the data. Besides, human characteristics are susceptible to changes over time. As technology progresses, these characteristics may also be counterfeited. Furthermore, biometric data authentication systems, and particularly portable biometric data authentication systems, can be very costly to implement.

It is also possible for users to access data on their systems using remote access software. Telnet is one widely available solution that allows users to access data remotely. A user at a remote location can log in to his home system using his identification (ID) and password. The problems associated with the use of passwords outlined above also apply to the use of passwords with remote access software. With these applications, besides remembering the password, the user must also remember his user ID as well.

An additional problem with Telnet is that it transfers all data unencrypted, i.e. as plain text. This means data transmission over the network is highly insecure. People who are determined to obtain the data can sniff out the data easily. One solution to this problem is the use of Secure Shell (SSH). SSH is a network protocol that allows data to be exchanged over a secure channel between two computers. Data encryption provides confidentiality and integrity of the data thus transmitted. SSH uses public-key cryptography to authenticate the remote computer and allow the remote computer to authenticate the user, if necessary. Reliable and secure exchange of the public key is a difficult problem to solve. If the public key is sent using the same channel as the data that is being exchanged, the public key can be subject to interception. If it is intercepted, it is possible intercept the data (the man-in-the-middle attack).

An additional problem with remote access software is that, in order to make the remote connections, the user may need to remember the internet protocol (IP) address of the host computer. As it is, remembering static IP addresses can be a problem for the users. For dynamic IP addresses, this problem is compounded.

A need therefore exists to provide a system and method to address one or more of the above problems.

SUMMARY

Embodiments of the present invention provide a portable system and method for accessing data from a remote location. A first aspect of the present invention provides a portable system for accessing data stored on a host system from a remote system using a data link, the system including a first module and a second module, each of the modules being associated with the host system, wherein the first module is capable of being connected to the host system and the second module and the second module is capable of being connected to the remote system to establish a secure communication channel between the first and second modules across the data link to access the data.

In one embodiment, the first and second modules may be initially connected to each other, the first module may then connected to the host system, and the association is accomplished using a unique identifier of the host system.

In one embodiment, the unique identifier of the host system may be at least one identifier selected from a group consisting of a media access control address of the host system, a hard disk identification number of said host system, an internet protocol address of said host system, and a randomly generated pairing identifier.

In one embodiment, the first and second modules may be initially connected to each other and to the host system, and the first and second modules then generate a random master cryptographic key that is stored on each of the first and second modules wherein the second module obtains an address of the host system to enable the remote system to access files on the host system when the second module is inserted into the remote system. The secure communication channel may be established by generating a session key from the master cryptographic key. The first and second modules may be connected to each other using one of an electromagnetic signal based connection and a physical electrical connection.

In one embodiment, the secure communication channel may be established by generating a session key from said master cryptographic key.

In one embodiment, the first and second modules may be connected to each other using one of an electromagnetic signal based connection and a physical electrical connection.

In one embodiment, the first module may connect to the host system using a universal serial bus (USB) connector, and the second module may connect to the remote system using a USB connector.

In one embodiment, the data may be virtually copied to the first module to provide the data access and only the virtually copied data is available to the remote system when and only when connected to the second module.

In one embodiment, the data link may be selected from a group consisting of the Internet, a local area network, a wide area network, and a wireless network.

In one embodiment, the data link may be routed via a trusted third-party.

In one embodiment, the trusted third-party may maintain the association information and uses said association information to complete a data connection between said first and second modules.

In one embodiment, the trusted party may revoke the system pairing.

A second aspect of the present invention provides a method of accessing data stored on a host system from a remote system using a data link, the method including the steps of providing a system including a first module and a second module initially connected to each other, connecting the first module of the system to the host system, associating the first module, the second module and the host system with each other, disconnecting the second module from said first module and connecting the second module to the remote system to establish a secure communication channel between the first and second modules across the data link to access the data.

In one embodiment, the associating step may be accomplished using a unique identifier of the host system.

In one embodiment, the unique identifier of the host system is at least one identifier may be selected from a group consisting of a media access control address of said host system, a hard disk identification number of the host system, an internet protocol address of the host system, and a randomly generated long system pairing identifier In one embodiment, the associating step may further include generating a master cryptographic key that is stored on each of said first and second modules and providing an address of the host system to the second module.

In one embodiment, the master cryptographic key can be generated using a random number generator and wherein a cryptographic protocol used for securing the data link between the first module and the second module is selected from a group consisting of symmetric key cryptography, asymmetric key cryptography, and one-time pad cryptography.

In one embodiment, the connecting step may further include generating a session key from said master key to establish said secure communication channel.

In one embodiment, the first and second modules may be initially connected to each other using one of an electromagnetic signal-based connection and a physical electrical connection.

In one embodiment, the first and second modules may be initially connected to the host system and said remote system using one of an electromagnetic signal-based connection and a physical electrical connection.

In one embodiment, the first module may be a USB, and the first connecting step may comprise connecting the USB to the host system, and the second module may be a USB, and the second connecting step comprises connecting said USB to the remote system.

In one embodiment, the first connecting step may further comprise a step for virtually copying the data to the first module after the associating step, such that only the virtually copied data is available to the second module.

In one embodiment, the data link may be selected from a group consisting of the internet, a local area network, a wide area network, and a wireless network.

In one embodiment, the data link may be routed through a trusted third-party.

In one embodiment, the trusted third-party may maintain the association information and use the association information to complete a data connection between the first and second modules.

In one embodiment, the trusted third party can revoke the association between said first module, the second module, and the host system.

DETAILED DESCRIPTION

Embodiments of the present invention provide a system and method for allowing a user to securely access data stored on a first system from a remote system. It is understood that the systems can be any computing device capable of making a remote connection. For example, the first system may be a home or office computer system, a PDA, etc. The remote connection can be, by way of example and not limitation, an internet connection, a LAN or WAN connection, an IR, bluetooth, short-range radio channels such as Bluetooth, UWB, Wi-Fi, long-range radio channels such as GSM, GPRS, 3G, proprietary radio connections, or even wired connections such as optical links. For ease of discussion, the first system will be referred to as the host system, while the remote system will be referred to as the remote computer.

Figure 1:
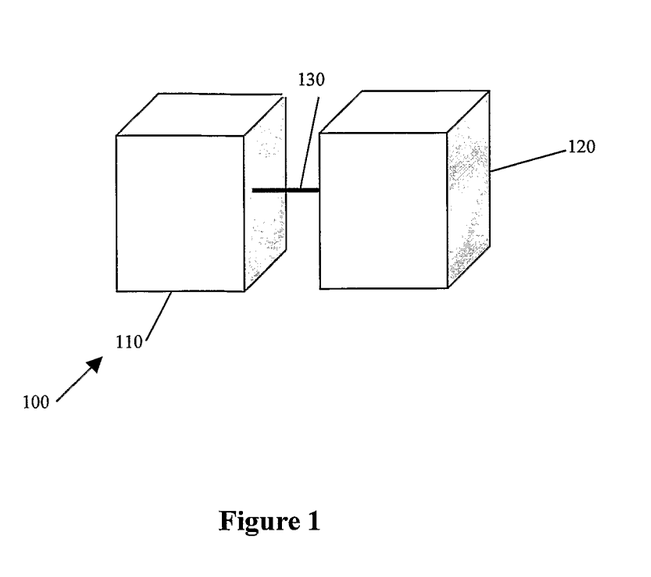
FIG. 1 illustrates one embodiment of a system for providing secure, seamless file sharing between a host computer and a remote computer according to the present invention.

FIG. 1 illustrates one embodiment of a system 100 according to the present invention. System 100 includes a first hardware module 110 and a second hardware module 120. The modules 110, 120 can be connected to each other via a connection 130. The module 110 is configured to be connected to a host system, while the module 120 is configured to be connected to a remote system.

The connection 130 between the modules 110, 120 and the respective systems may be made, by way of example and not limitation, using a physical electrical interface. The connection 130 may be established such that the user connecting module 110 and module 120 is absolutely sure that these two modules are connected. The physical electrical interface may include, but is not limited to a standard USB connector, a firewire connector, a serial interface, a parallel interface, a physical cable, a proprietary electrical connection, and a network interface. Alternately, the connection between the modules 110, 120 may be any type of electromagnetic signal-based communication (i.e. infrared, radio frequency, microwave, Bluetooth, 3G, 4G, GSM etc.).

When the connection 130 is based on electromagnetic signal-based communication such as radio, then the two modules 110 and 120 can have attributes that the user knows that will enable him to know that modules 110 and 120 are being connected (when they are being connected). For example, the manufacturer of system 100 can ensure that only modules 110 and 120 of system 100 are unique to each other, and can be connected to each other and no other modules.

In some embodiments, the modules 110, 120 receive electrical power from the respective systems. In alternate embodiments, the modules 110, 120 may contain an independent power source.

Figure 2A:
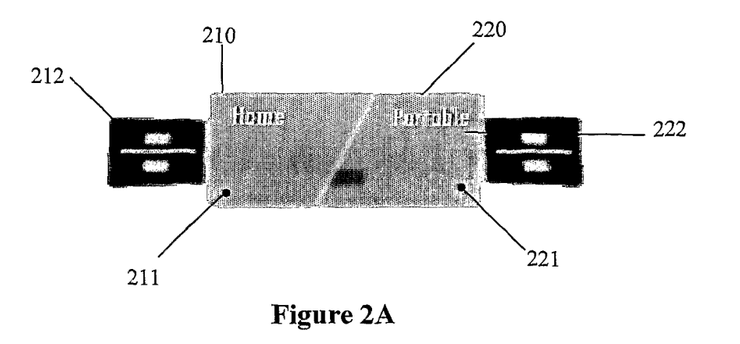
FIG. 2A illustrates an alternate embodiment of a system for providing secure, seamless file sharing between a host computer and a remote computer according to the present invention.

FIG. 2A illustrates a USB system 200 that provides a specific operational implementation of the system 100. While the following discussion will outline the use of the USB system 200, it is understood as discussed above that many other types of connections besides USB can also be used. The USB system 200 includes a HomeUSB 210 and a PortableUSB 220 each having its own male USB connector 212, 222 respectively. In this embodiment, the HomeUSB 210 is the master device. However, it is understood that the requisite software may be resident on both the HomeUSB 210 and PortableUSB 220. Whichever device is connected to the host system 330 (see below) may become the HomeUSB 210.

Figure 2B:
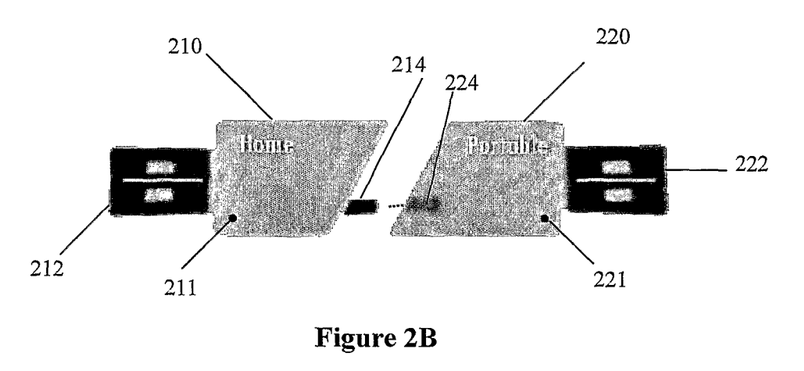
FIG. 2B illustrates the device of FIG. 2A showing the two hardware modules in a disconnected state.

FIG. 2B shows the HomeUSB 210 and PortableUSB 220 in a disconnected state. As shown in this Figure, the HomeUSB 210 can be connected to the PortableUSB 220 by way of a male connector 214. PortableUSB 220 includes a corresponding female connector 224. The various operations of the USB system 200, the HomeUSB 210 and the PortableUSB 220 are described below. As discussed above with reference to FIG. 1, it is understood that the connectors 214, 224, which correspond to connection 130, are provided by way of example only.

As will be explained in more detail below with reference to FIGS. 3-7, the system 200 allows a user to initiate a secure connection between the host computer and the remote computer. The system 200 provides hardware encryption and authentication. No passwords are required. A user can insert the system 200 into a USB slot on a host computer (see FIGS. 3 and 4). A user selects files to be shared from the host computer, and the software on the HomeUSB 210, which is loaded onto the host computer, virtually copies the selected files onto the HomeUSB 210. The PortableUSB 220 is then removed, leaving the HomeUSB 210 plugged into the host computer, and connected to a network. The user inserts the PortableUSB 220 into a USB slot on a remote system. Software is downloaded onto the remote system from the PortableUSB 220, and a secure connection is established between the remote computer and the home computer, allowing the user to securely retrieve any of the files that were virtually copied onto the HomeUSB 210. A detailed discussion of the process is provided below with reference to FIGS. 5 and 6.

The HomeUSB 210 and PortableUSB 220 may contain integrated circuit (IC) chips, which are tamper-resistant. These IC chips may have pre-stored operating systems (OS) and software. Specific details concerning the operation of the system 200, the HomeUSB 210 and the PortableUSB 220 are discussed below. The OS as discussed above can be any known OS. Examples of such OS can include, but are not limited to Disk Operating System (DOS)-based, Microsoft Windows®-based, Linux®-based, Novell Netware®-based, Apple MAC®-based, proprietary OS's, and the like.

In some embodiments, the HomeUSB 210 and PortableUSB 220 may have markings, LED lights, audio cues or other indicators (not shown) to show that the HomeUSB 210 and PortableUSB 220 are compatible. The indicators allow a user who, for example, has multiple home computers to access each of them individually using a separate system 100, 200. In alternate embodiments, a single PortableUSB 220 may be used to access multiple HomeUSBs 210. In other alternate embodiments, multiple PortableUSBs 220 may access a single HomeUSB 210. Similarly, multiple HomeUSBs 210 may access and be accessed by multiple PortableUSBs 220. In alternate embodiments, the HomeUSB 210 and Portable 220 may have indicators 211, 221 to indicate their status. For example, when using LED lights for indicators 211, 221, red lights may indicate data is being transferred, while a change in light colors from red to green may indicate completion of the data transfer etc.

Figure 3A:
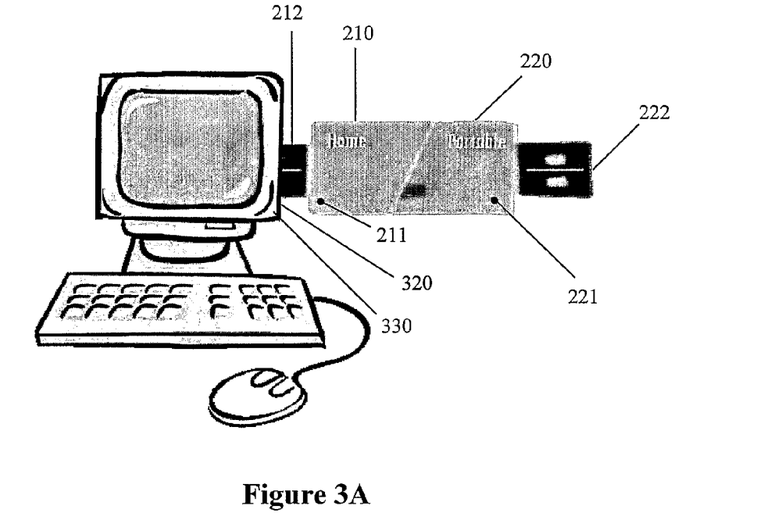
FIG. 3A illustrates the connection of the system of FIGS. 1 and 2 to a host system.

FIG. 3A illustrates one embodiment of a system 300, capable of using the system 100, 200. In this embodiment, the connector 212 of the system 200 is plugged into a corresponding port 320 of a host system 330. The specific operation of the system 200 with the host system 330 is discussed below with respect to FIG. 5.

Figure 3B:
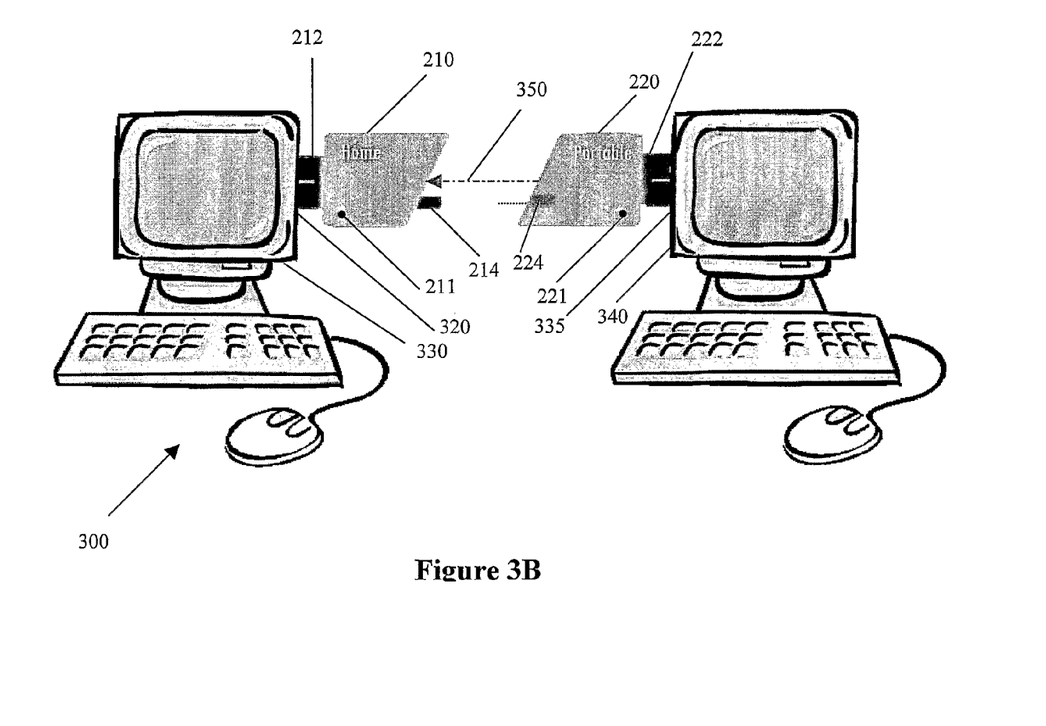
FIG. 3B illustrates the separate connections of two hardware modules associated with the system of FIGS. 1 and 2.

FIG. 3B illustrates an expanded version of the system 300 that uses the USB system 200. The connector 222 of the PortableUSB 220 has been inserted into a corresponding port 335 of a remote system 340. Once the PortableUSB 220 has been inserted, the remote system 340 establishes a connection 350 with the host system 330 to access the data that was selected and stored on the HomeUSB 210. In some embodiments, the connection 350 may be an Internet connection. However, the connection may be any type of hard wired, optical, or wireless connection known to those of skill in the art.

Figure 4A:
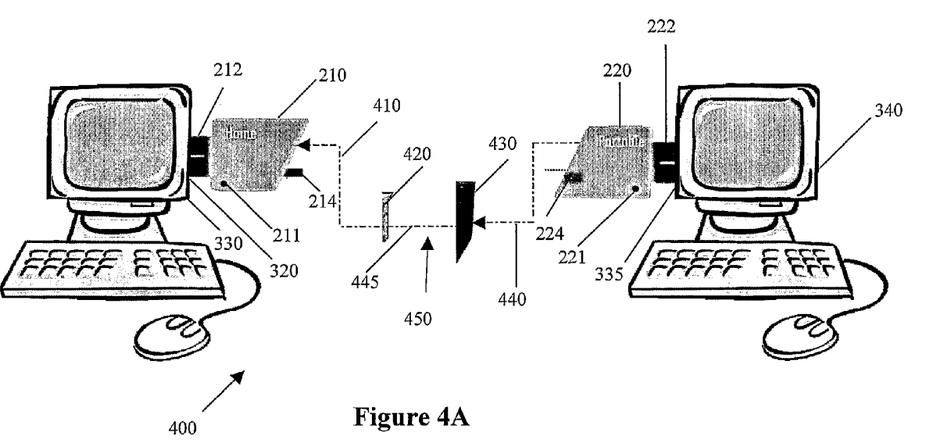
FIG. 4A illustrates the separate connections of the system of FIGS. 1 and 2 involving a firewall and a trusted third-party server.

For some applications using the system 100, 200, it may be advantageous to use a trusted third-party to facilitate the connection between the remote system 340 and the host system 330. FIG. 4A illustrates an alternate embodiment of a system 400 that is capable of using the system 100, 200. As with the system 300, the connector 212 of the HomeUSB 210 is plugged into the corresponding port 320 of the host system 330. The connector 222 of the PortableUSB 220 has been inserted into the corresponding port 335 of the remote system 340. Once the PortableUSB 220 has been inserted, the remote system 340 establishes a connection 450 with the host system 330 via the HomeUSB 210 to access the data that was selected from the host system 330 and stored on the HomeUSB 210. In this embodiment, the host system 330 is behind a firewall 420. A data path 410 connects the HomeUSB 210 to the firewall 420. Data can be routed to/from the firewall 420 via data path 445 to a trusted third-party server 430, and to/from the trusted third-party server 430 to the PortableUSB 220 via data path 440. Details of the operation will be discussed below with respect to FIGS. 5-7. In alternate embodiments, the remote system 340 may also be behind a firewall.

The third-party server 430 can be useful in several applications. In the embodiment shown in FIG. 3, if the host system 330 network address is static, this address can be stored in the PortableUSB 220. When the user at the remote system 340 desires to connect to the host system 330, the remote system 340 obtains the host system's address from the PortableUSB 220 and can connect to host system 330. The network address of the host system 330 is part of the initialization attribute. This will be discussed in more detail below with reference to FIGS. 5 and 6.

To provide additional security, it is possible to use the trusted third-party 430 for managing the network address of the host system 330. When the system 100, 200 is initialized, the system 100, 200 is assigned a randomly generated (at-least 20-Byte) Pairing Identifier (PI). This PI, along with the network address of the host system 330, is registered with the trusted third-party 430 over a secure link (using, for example, secure sockets layer (SSL)) during initialization. This PI is also stored on the PortableUSB 220, instead of the actual host system network address. When the remote system 340, using the PortableUSB 220, desires to connect to the host system 330, it first contacts the trusted third-party 430 and presents the PI. The trusted third-party 430 then checks whether the PI is registered with it and whether it is still valid. If so, the trusted third-party 430 sends the host system network address back to the remote system 340. In some embodiments, these exchanges between the trusted third-party 430 and the system 100, 200 can be protected using, e.g. SSL.

Additionally, the system 400 may facilitate easier data transfer when dynamic IP addressing is used on the host system 330. Dynamic IP addressing may be used, for example, when using a network address translator or when the host system 330 is behind the firewall 420. In this scenario, each time the IP address of the host system 330 changes, the HomeUSB 210 will inform the trusted third-party server 430 of the changes. In some embodiments, the user would be expected to connect the HomeUSB 210 and the host system 330 to the trusted third-party server 430 periodically to validate and update the configuration. In other embodiments, if the host system 330 is unable to connect to the trusted third-party server 430, the HomeUSB 210 will automatically disable itself. Alternatives to the use of dynamic IP addresses may be, by way of example and not limitation, the use of hole punching techniques (i.e. TCP and UDP hole punching), for example, routing all traffic between the HomeUSB 210 and the PortableUSB 220 through the trusted third-party server 430. Hole punching techniques establish connections between systems that are behind firewalls.

Figure 4B:
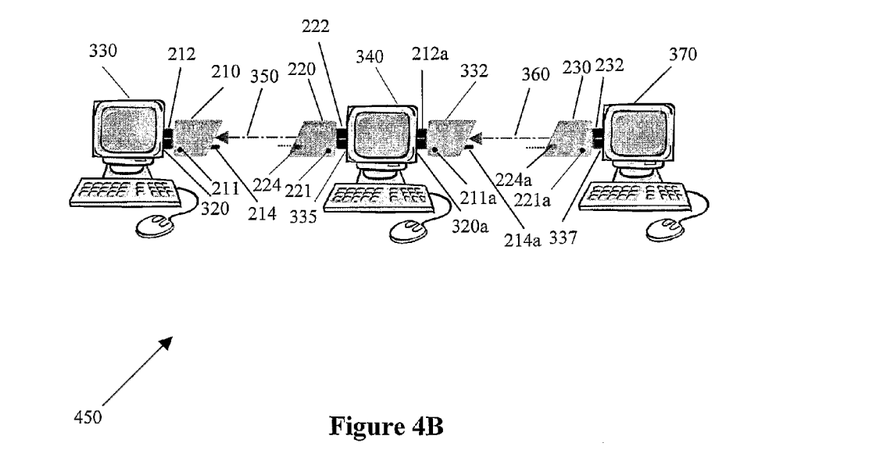
FIG. 4B illustrates the separate connections of the system of FIGS. 1 and 2 with an additional remote computer.

FIG. 4B illustrates an alternate embodiment of a system 450 that is capable of using system 100, 200. As with the system 300, the connector 212 of the HomeUSB 210 is plugged into the corresponding port 320 of the host system 330. The connector 222 of the PortableUSB 220 has been inserted into the corresponding port 335 of the remote system 340. Further, an additional HomeUSB 332 can be paired with an additional PortableUSB 230. The HomeUSB 332 can be plugged into the remote system 340 via a connector 212a, into a corresponding port 320a of the remote system 340, while PortableUSB 230 can be plugged via a connector 232, into a corresponding port 337 of an additional remote system 370. PortableUSB 230 may include a corresponding female connector 224a, that facilitates connection to the HomeUSB 332 via connector 214a.

Once the PortableUSB 220 has been inserted, the remote system 340 establishes a connection 350 with the host system 330 via the HomeUSB 210 to access the data that was selected from the host system 330 and stored on the HomeUSB 210. The PortableUSB 230, once inserted into the corresponding port 337 of the remote system 370, can establish a connection 360 with the HomeUSB 332, to access the data that was selected from the host system 330 and stored on the HomeUSB 210. It is understood that additional remote systems and PortableUSBs may be added to this configuration. Similarly, the same configuration could be used with the system 300 to extend the connections to additional remote systems.

Figure 5:
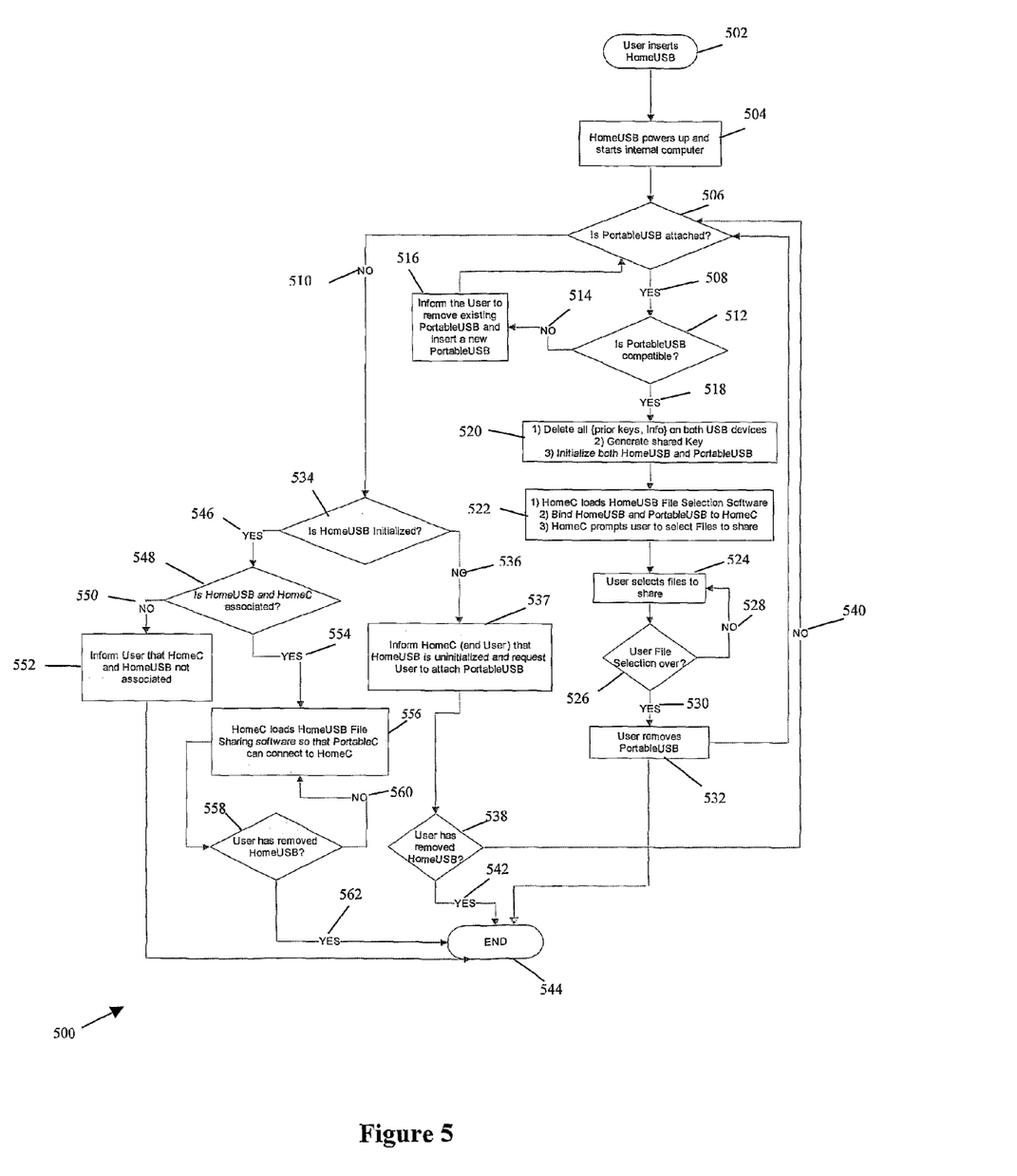
FIG. 5 illustrates a flowchart showing one method for connecting and operating the system of FIGS. 1 and 2.
Figure 6:
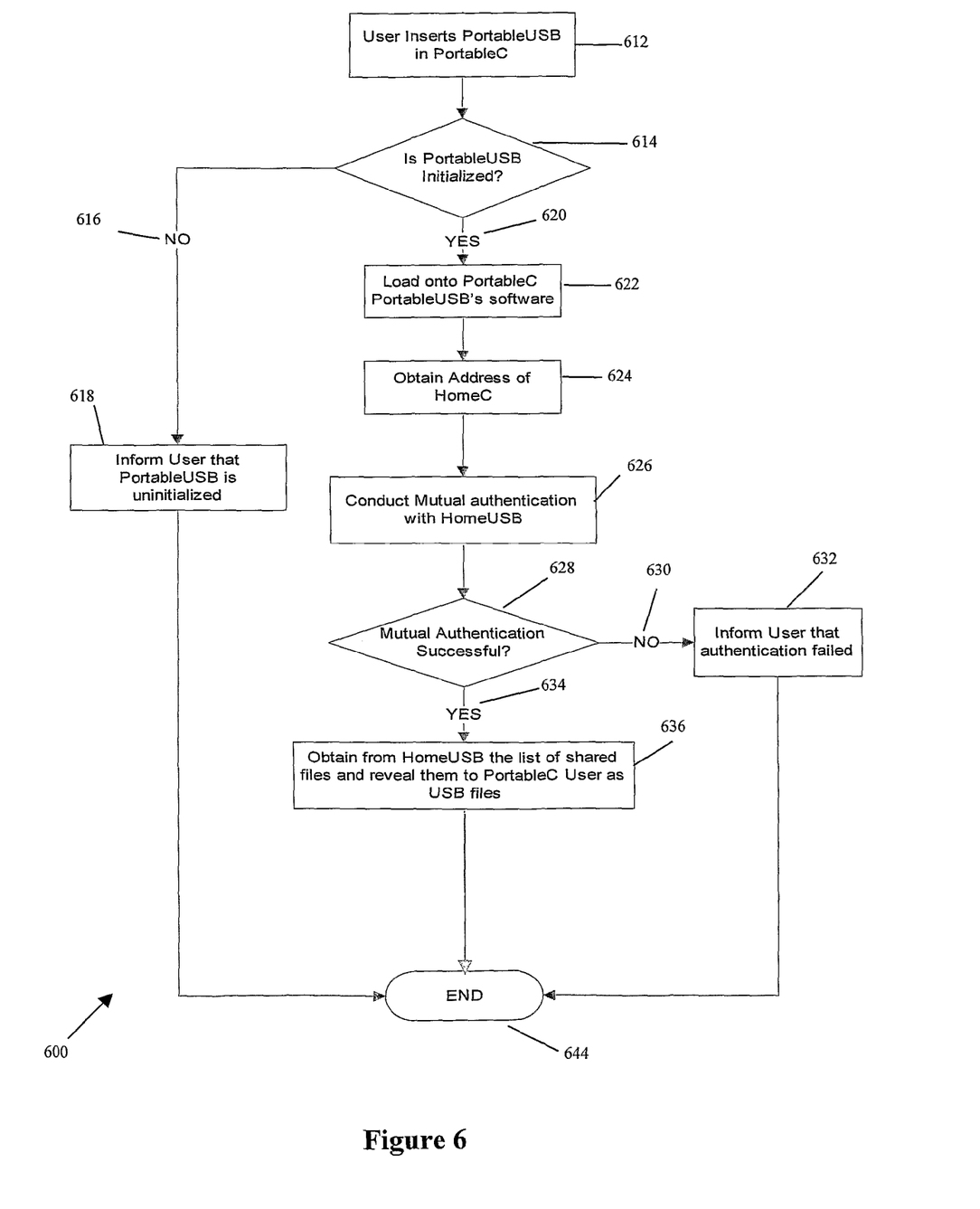
FIG. 6 illustrates a flowchart showing one method of connecting a portion of the system of FIGS. 1 and 2 to a remote computer system.

FIG. 5 illustrates one embodiment of a flowchart showing one method, designated generally as reference numeral 500, for connecting and operating the system 100, 200. While the following process discussion uses the embodiment of the system 200 described above, it is understood that similar steps apply regardless of the specific hardware and connections that are used. As previously stated, all configurations of the systems 100, 200, 300, 400 and 450 are deemed to fall within the scope of the present invention. In FIGS. 5 and 6, the host system 330 is designated as the HomeC, while the remote system 340 is designated as the PortableC.

The method 500 begins with a user inserting the connector 212 of the HomeUSB 210 into the corresponding port 320 of the host system 330, as shown with reference numeral 502. In an example embodiment, the host system 330, running on an operating system installed by the user, may have a pre-installed USB software module that effects initialization between the host system 330 and the HomeUSB 210. For example, Windows® based operating systems will detect the insertion of the HomeUSB 210. In some applications, the operating system on the host system 330 may also automatically execute programs stored on the HomeUSB 210. Programmers skilled in USB programming will be familiar with this type of programming.

The HomeUSB 210 then powers up and initializes one or more internal software modules, as shown with reference numeral 504. These software modules allow the HomeUSB 210 to determine if the PortableUSB 220 is attached, as shown with reference numeral 506. At this time, one or more of the software modules stored on the HomeUSB 210 may also be loaded onto the host system 330 to allow various communications from the HomeUSB 210 and PortableUSB 220 to be displayed to the user. The PortableUSB 220 may also have one or more internal software modules that communicate with the HomeUSB 210 and/or the host system 330. Using the initialized software modules on the HomeUSB210 and PortableUSB 220, if the PortableUSB 220 is attached, as shown with reference numeral 508, the HomeUSB 210 checks to see if the PortableUSB 220 is compatible, as shown with reference numeral 512. As discussed above, it is possible to configure the system 200 such that a single HomeUSB 210 is compatible with only one PortableUSB 220, thus providing an added measure of security to prevent unauthorized access to the data that the user wishes to protect. Alternately, multiple PortableUSBs 220 may be configured for a single HomeUSB 210, as previously discussed. The situation where the PortableUSB 220 is not attached is described in more detail below.

If the PortableUSB 220 is not compatible, as shown with reference numeral 514, the user is instructed to remove the PortableUSB 220 and insert an alternate/correct PortableUSB 220, as shown with reference numeral 516. Step 506 is then repeated. If the PortableUSB 220 is compatible, as shown with reference numeral 518, the system 200 then deletes all prior association information contained on both the HomeUSB 210 and PortableUSB 220, generates a shared key, and initializes both the HomeUSB 210 and PortableUSB 220, as shown with reference numeral 520.

When a HomeUSB 210 and PortableUSB 220 are paired together and powered, they become "initialized". In the "initialized" state, the HomeUSB 210 and PortableUSB 220, using the various software modules discussed above, are physically bound to the host system 330 (and user login-ID) that it is associated with. The physical binding is enforced using unique computer identifiers, e.g. the MAC address, Hard-disk ID, etc. on desktop computers. After initialization, the HomeUSB 210, the PortableUSB 220 and host system 330 all share a randomly selected long system pairing identifier, PI, that is generated using the software modules loaded onto the HomeUSB 210. In a preferred embodiment, the PI is at least 20-Bytes long. In some embodiments, an initialized HomeUSB 210 can be un-initialized and then freshly re-initialized by pairing with a new PortableUSB 220. The HomeUSB 210 and PortableUSB 220 can also be un-initialized using software, e.g. a user could right click on a USB file system icon on the desktop and select the de-initialize option.

After initialization of the system 200, and using one or more of the software modules discussed above, the HomeUSB 210 and PortableUSB 220 share a MASTER Key, the network address of the host system 330, and the randomly selected system 200 Pairing Identification number. In some embodiments, the HomeUSB 210 and PortableUSB 220 may also share encrypted selected file set information. Similarly, after initialization, the HomeUSB 210 and host system 330 share the randomly selected system 200 Pairing Identification number and the host system's 330 unique computer identifier. The computer identifiers may be derived from one or more of the host system's 330 hardware and software identifiers. These can include, but are not limited to, the hard-disk ID (a unique number for every hard disk), the MAC address (a unique number associated with every network interface card), and/or a user Login-ID. A specific discussion of the procedures involved in these steps, and of the use of encryption keys in general, is provided below.

Once the HomeUSB 210 and PortableUSB 220 are initialized, a software module residing on the HomeUSB 210 directs the host system 330 to load the file selection software stored on the HomeUSB 210, associates (binds) the HomeUSB 210 and PortableUSB 220 to the host system 330, and prompts the user to select the files that the user wishes to make available for access from the remote system 340, as shown with reference numeral 522. The user then selects the files, as shown with reference numeral 524. The host system 330 then prompts the user to determine if the file selection process has been completed, as shown with reference numeral 526. If selection is not completed, as shown with reference numeral 528, steps 524 and 526 are repeated. If selection has been completed, as shown with reference numeral 530, the user is then prompted to remove the PortableUSB 220, as shown with reference numeral 532. Upon unplugging the PortableUSB 220 from the remote system 340, the software module that facilitates the connection between the HomeUSB 210 and PortableUSB 220 will terminate. This ends the initial setup, a shown with reference numeral 544.

In some embodiments, if the operating system of the host system 330 does not detect the insertion of the HomeUSB 210 into a corresponding port, or if the software modules loaded onto the host system 330 are not set to automatically initiate the programs stored on the HomeUSB 210 and/or PortableUSB 220, the user may manually start the process discussed above. As previously stated, the HomeUSB 210 and PortableUSB 220 may contain software modules that facilitate connection to a number of different operating systems. In a preferred embodiment, once the HomeUSB 210 is inserted into the host system 330, all of the steps concerned with initializing the devices, associating the HomeUSB 210, PortableUSB 220, and host system 330, generating the key information, and launching the file selection software, are performed automatically. The user simply needs to insert the HomeUSB 210 into the host system, and the selection software will appear allowing the user to select the desired files.

As previously discussed, in the embodiment illustrated in FIG. 5, the file selection step 524 is a virtual selection, i.e. no files are actually copied onto the HomeUSB 210. A map, data path, or shortcut is established on the HomeUSB 210 to the specific files on the host computer 330. In alternate embodiments, actual file transfer may occur, and copies of the selected files may be encrypted and stored on the HomeUSB 210. In some embodiments, actual copies of the selected files, which may be encrypted using one or more software encryption modules discussed above, may be stored on the PortableUSB 220. In some embodiments, the PortableUSB 220, via the remote system 340, can only access data from the host system 330 that has been copied to the HomeUSB 210.

Returning to step 506, if the PortableUSB 220 is not attached to the HomeUSB 210, as shown with reference numeral 510, the software modules running on the HomeUSB 210 perform a check to determine if the HomeUSB 210 has been initialized, as represented by reference numeral 534. If the HomeUSB 210 has not been initialized, as represented by reference numeral 536 (see step 520), the system informs the user that the HomeUSB 210 has not been initialized, and requests the user to connect the PortableUSB 220, as shown with reference numeral 537.

At this point, the system then checks to determine if the user has removed the HomeUSB 210, as represented by reference numeral 538. If the user removes the HomeUSB 210, as represented with reference numeral 542, the process ends, as represented with reference numeral 544. If the user does not remove the HomeUSB 210, as represented by reference numeral 540, step 506 is then repeated. The user thus has the option of attaching the PortableUSB 220, and restarting the process from step 506, or removing the HomeUSB 210, attaching the PortableUSB 220 external to the host system 330, and restarting the process from step 502.

Returning to step 534, if the HomeUSB 210 has been initialized, as represented by reference numeral 546, the system 200 checks to determine if the HomeUSB 210 and the host system 330 have been previously associated (see step 522). This process ensures that a HomeUSB 210 that has been previously associated with another computer is not inserted into an incorrect host system 330 in error. This allows a user to remove the associated HomeUSB 210, for example, to restrict all access to the data on the host system 330, and still re-connect the HomeUSB 210 at a later time to reinstate the access without needing to regenerate keys, etc. In alternate embodiments, it is possible to associate a single HomeUSB 210 with multiple host systems 330.

If the HomeUSB 210 and host system 330 are not associated, as represented by reference numeral 550, the system informs the user that the two are not associated, as represented by reference numeral 552, and the process ends, as represented by reference numeral 544. In a preferred embodiment, the association process will only take place when both the HomeUSB 210 and PortableUSB 220 are connected as a unitary system 200 to the host system 330.

If the HomeUSB 210 and host system 330 were previously associated, as represented by reference numeral 554, the host system 330 loads the file sharing software located on the HomeUSB 210 to facilitate the remote connection between the host system 330 and the remote system 340, as represented by reference numeral 556. The system will periodically check to ensure that the HomeUSB 210 is still connected to the host system 330, as represented by reference numeral 558. If the HomeUSB 210 is no longer connected, as represented by reference numeral 562, the process ends, as represented by reference numeral 544. As long as the connection is maintained, as represented by reference numeral 560, the files will be available to the user via the PortableUSB 220 connected to the remote system 340. This connection will be discussed in more detail below with reference to FIG. 6.

Key Management

With reference to step 520, a brief discussion of the process of cryptographic key management for the embodiments of the present invention will now be provided. When the HomeUSB 210 and PortableUSB 220 are paired together (and powered by inserting the system 200 into the host system 330), internal software modules, running in the background, create a randomly generated fresh MASTER shared key. This MASTER shared key is stored inside the USB tokens in hardware, i.e. on the chips previously discussed. The MASTER key need never leave the USB token. All encryption/decryption operations that are done are thus hardware based. No user identification or passwords need be used. Additionally, in a preferred embodiment, the process takes place seamlessly, no user intervention of any kind is required.

The PortableUSB 220 can be removed from an initialized system 200 and inserted into a remote system 340 to enable the user to access the files previously selected on the host system 330. After the HomeUSB 210 and PortableUSB 220 authenticate themselves using the MASTER shared secret key resident on the HomeUSB 210 and PortableUSB 220, the two USB devices 210, 220 can set up session keys that last for the session, thus establishing a secure connection between the host system 330 and the remote system 340. This is discussed in more detail below. The host system 330 and remote system 340 thus know the session keys, but not the MASTER shared key. The authentication mechanism between the HomeUSB 210 and PortableUSB 220 can use either symmetric key or public key cryptography. Many standard authentication techniques that allow two entities to authenticate themselves using a shared key are known to those of skill in the art. All such cryptographic systems and authentication techniques are deemed to fall within the scope of the exemplary embodiments.

When using a symmetric key based system, the shared key can be a symmetric key e.g. Advanced Encryption Standard (AES) 256 bits, which is generated during the system 200 initialization phase 520. When using a public key-based system, the HomeUSB 210 and PortableUSB 220 can each generate their own public-private key-pairs and exchange their public keys during the system 200 initialization phase 520.

In alternate embodiments, a one-time pad encryption may be used. The various software modules running in the background on the HomeUSB 210 and PortableUSB 220 can generate a pre-defined set of random numbers during the initialization phase. These random numbers are stored on each of the HomeUSB 210 and PortableUSB 220. These random numbers are unique and can serve as encryption keys for a one-time pad based encryption scheme. If large amounts of data need to be shared, then the one-time pad can be used for generating a symmetric crypto based session key that can be used for encrypting sessions. Once a key has been used as a one-time pad, it should be deleted from both the HomeUSB 210 and PortableUSB 220.

In some embodiments, the PortableUSB 220 uses a tamper-proof IC card for storing the keys. As known to a person skilled in the relevant art, a tamper-proof IC card provides additional security. However, in alternate embodiments, a tamper-proof IC card may not be required. This may create additional problems. For example, an attacker may be able to obtain the shared key (stored in the PortableUSB 220) and clone the PortableUSB 220. He could then connect to the HomeUSB 210 using the PortableUSB clones until the theft of the PortableUSB 220 is noticed and action is taken. Even if the theft of the PortableUSB 220 is noticed, an attacker may still be able to record encrypted information exchanged between the PortableUSB 220 and the HomeUSB 210. Once the shared key from the PortableUSB 220 has been obtained, recorded data can be decrypted.

In some embodiments, one solution to prevent the above attacks may use a key-evolving threshold crypto-based shared key. One way to implement this solution is to use the RSA algorithm (the term "RSA" is derived from the initials of the names of the three inventors). During system 200 initialization 520, the HomeUSB 210 generates an RSA key-pair. In alternate embodiments, it is possible to use a pure symmetric key only solution even with key evolution.

Following is a discussion of the RSA solution, in which: N is the Modulus, i.e. a product of two large primes N=p*q; e is a public exponent and d is a secret exponent having a relationship;

$$ed = 1 \bmod \Phi(N) \quad (1)$$

where "mod" is the modulus function and $$\Phi(N) = (p-1)(q-1) \quad (2)$$

Additionally, M denotes a message, C denotes cipher text, and D denotes a cryptographic digest of message M. Then, for example, to decrypt a cipher text C, one computes $M = C^d \bmod N$. To sign a message M, one computes $D^d \bmod N$. PI denotes the pairing PI previously discussed. H denotes cryptographic hash functions, such as SHA-1.

When applying the above method, the HomeUSB 210 can generate a private key d and split it into two shares such that $d = d_1 + d_2$. The HomeUSB 210 can then retain one share ($d_1$) and transmit ($d_2$) to the PortableUSB 220. After this transmission, the HomeUSB 210 may delete d as well as $d_2$ from its memory. In this embodiment, $d_1$ and $d_2$ may be selected randomly from [1,2, ... $\Phi(N)$], where:

$$d = d_1 + d_2 \bmod \Phi(N) \quad (3)$$

When the PortableUSB 220 wants to authenticate itself to the HomeUSB 210 (see the discussion of FIG. 6 below), it generates a random number nonce. In this embodiment, the following steps are followed by both the PortableUSB 220 and the HomeUSB 210. It is understood that the steps outlined below are provided by way of example only. The below steps should be used as a guideline only.

PortableUSB 220→HomeUSB 210: CurrentTime, {CurrentTime}$^{d2}$ mod N,
{Nonce1, TwinUSB Pairing Identifier}$^{e}$ mod N,
{Nonce1, TwinUSB Pairing Identifier}$^{d2}$ mod N To implement the method, the HomeUSB 210 first checks whether the CurrentTime is within its acceptable time delay. The acceptable time frame will depend on the underlying channel used for exchanging data. Anything more than twice the normal delivery time will be considered unacceptable. The HomeUSB 210 then computes:

$$\{CurrentTime\}^d \mod N \quad (4)$$

The HomeUSB 210 then computes:

$$\{CurrentTime\}^{d1} * \{CurrentTime\}^{d2} \mod N = \{CurrentTime\}^{d1+d2} \mod N \quad (5)$$

and $$S = \{CurrentTime\}^d \mod N \quad (6)$$

The HomeUSB 210 then computes:

$$Check = S^e \mod N \quad (7)$$

And if Check=CurrentTime, then the HomeUSB 210 has authenticated the PortableUSB 220.
Next, the HomeUSB 210 determines value for:

$$\{Nonce1, PI\}^{ed1} \mod N \quad (8)$$

and then computes $$\{Nonce1, PI\}^{ed1} * \{Nonce1, PI\}^{ed2} \mod N = Nonce1, PI \quad (9)$$

The HomeUSB 210 then verifies the Portable 220 Pairing Identifier.
HomeUSB 210→210 PortableUSB 220:
    Hash(Nonce1), $\{Nonce2, PI\}^e \mod N$,
    $\{Nonce2, PI\}^{d1} \mod N$
The PortableUSB 220 first checks whether the Hash(Nonce1) is correct. Since PortableUSB 220 already possess Nonce1, it just needs to compute the hash of Nonce1 and compare it to the value sent by the HomeUSB 210.
Then the PortableUSB 220 computes:
    $\{Nonce2, PI\}^{ed2} \mod N$, then computes $\{Nonce2, PI\}^{ed1} * \{Nonce2, PI\}^{ed2} \mod N = Nonce2, PI$
    Thus providing Nonce2 to the PortableUSB 220.
Now both the PortableUSB 220 and HomeUSB 210 have two nonces, Nonce1 and Nonce2 which only they share. The session key(s) can be derived from Hash (Nonce1, Nonce2). All communication between the HomeUSB 210 and the PortableUSB 220 is then protected using the session Key.

Forward Secrecy

In some embodiments, it may be desirable to ensure that disclosure of the session key (or MASTER shared key) does not disclose data that was exchanged in earlier time intervals. To accomplish this, after a certain amount of time (or number of communication runs), the HomeUSB 210 and PortableUSB 220 refresh their shares of the private key d.
At the beginning of each refresh period, let $d_1$ be the private key share on the HomeUSB 210 and $d_2$ be the share on the PortableUSB 220. The HomeUSB 210 then computes:

$$d_1 = d_1' + d_1 2 \mod \Phi(N); \quad (10)$$

The PortableUSB 220 then computes $$d_2 = d_2' + d_2 2 \mod \Phi(N); \quad (11)$$

The HomeUSB 210 and the PortableUSB 220 then exchange $d_1 2$ and $d_2 2$. To update to their new shares, the HomeUSB then computes $$d_{1new} = d_1' + d_2 2 \mod \Phi(N) \quad (12)$$

Similarly, the PortableUSB 220 then computes $$d_{2new} = d_2' + d_1 2 \mod \Phi(N) \quad (b\ 13)$$

All the above messages are protected using the session key generated using the previous key shares. Once the HomeUSB 210 and the PortableUSB 220 have generated new shares, the old session is dropped and a new session started, starting with mutual authentication. The HomeUSB 210 and PortableUSB 220 also delete all traces of the old key shares. In a preferred embodiment, all of the key generating steps discussed above are performed internally by software modules running in the background on the HomeUSB 210, PortableUSB 220 and/or host system 330. The process runs seamlessly and no user intervention is required.

This key refresh technique prevents an attacker from decrypting prior recorded messages. For example, if we assume that an attacker has obtained the PortableUSB 220 with its current key share as $d_{2new}$, that attacker may be able to retrieve $d_{2new}$. Therefore, the attacker can retrieve all communication that was protected using $d_{2new}$. However all communication protected using $d_2$ (or any prior $d_2$'s) cannot be retrieved since no entity possesses $d_2$, as it been deleted!

However, if an attacker is able to obtain both the HomeUSB 210 and the PortableUSB 220, and able to retrieve "d", the private key, all recorded traffic can be decrypted. Hence it is highly desirable that if theft of a PortableUSB 220 is detected, the owner of the system 200 should de-initialize the HomeUSB 210, or pair it with another PortableUSB 220 (which then deletes all prior information), so that theft of the HomeUSB 210 does not result in any data loss.

As previously discussed, after the system 200 has been initialized, the user can select the files that they would like to access using the PortableUSB 220. This Selected Files Set Info (henceforth referred to as SFS Info), can be stored on the HomeUSB 210 and provided to the PortableUSB 220 after mutual authentication. Whenever there are modifications to the SFS Info, e.g. changes in files in sub-directories in the SFS, the HomeUSB 210 may periodically update its SFS Info, and provide the latest SFS Info to the PortableUSB 220 after mutual authentication. In some embodiments, this SFS Info can also be stored on the PortableUSB 220, encrypted with the public key of the shared private key, and decrypted after mutual authentication between the HomeUSB 210 and the PortableUSB 220. Therefore, even if an attacker gets complete access to the contents of the PortableUSB 220, he will not get access to any data on the PortableUSB 220, since all data on the PortableUSB 220 is encrypted.

FIG. 6 illustrates one embodiment of a flowchart showing one method, designated generally as reference numeral 600, for connecting the PortableUSB 220 to the remote system 340 and viewing the files previously selected. It is understood that the PortableUSB 220 discussed here has already been initialized along with the HomeUSB 210, and appropriate encryption algorithms applied, as discussed above with respect to FIG. 5.

The method 600 begins with the user inserting the PortableUSB 220 into the remote system 340, as shown with reference numeral 612. Using the software resident on the PortableUSB 220, a determination is made as to whether or not the PortableUSB 220 has been initialized, as shown with reference numeral 614. If the PortableUSB 220 has not been initialized, as shown with reference numeral 616, the PortableUSB 220 informs the user that the PortableUSB 220 is not initialized, as shown with reference numeral 618, and the process ends, as shown with reference numeral 644.

If the PortableUSB 220 has been initialized, as shown with reference numeral 620, one or more software modules that are pre-loaded in the PortableUSB 220 are then loaded onto the remote system 340, as shown with reference numeral 622. These modules are designed to facilitate the connection between the PortableUSB 220 and the remote system 340, and between the PortableUSB 220 and the HomeUSB 210. The remote system 340 then obtains the address of the host system 330, as shown with reference numeral 624.

When the HomeUSB 210 and PortableUSB 220 are initialized and physically bound to the host system 330, the software that is pre-loaded onto the host system 330 will retrieve the address of the host system 330. This software module will pass the address of the host system 330 to the HomeUSB 210. The HomeUSB 210 will then pass the address of the host system 330 to the PortableUSB 220. As previously discussed, the address mentioned herein can be an IP address or an address pointer.

When an address pointer is stored on the PortableUSB 220 during the initialization phase of the HomeUSB 210 and the PortableUSB 220, the IP address (or network address) of the host system 330 is stored on the trusted third-party server 430 along with the address pointer. The address pointer is the pairing identifier. When a user wants to retrieve files stored on the host system 330 from the remote system 340, the user then inserts the PortableUSB 220 in the remote system 340. The various software modules stored on the PortableUSB 220 are first loaded onto the remote system 340. These software modules execute code to retrieve the network address of the host system 330 or the address pointer. If the IP address of the host system 330 is available, the remote system 340 can make a connection directly with the host system 330. If the address pointer is available instead, the remote system 340 firsts retrieves the IP address from the trusted third-party server 430 and then connects to the host system 330.

Mutual authentication between the PortableUSB 220 and the HomeUSB 210 can then be conducted, as shown with reference numeral 626 and described above. A determination is then made as to whether or not the mutual authentication is successful, as shown with reference numeral 628. If the authentication is not successful, as shown with reference numeral 630, the user is informed that authentication has failed, as shown with reference numeral 632, and the process ends, as shown with reference numeral 644.

If the authentication is successful, as shown with reference numeral 634, the list of shared files is obtained from the HomeUSB 210 and shown to the user of the remote system 340, as shown with reference numeral 636. The user can access and work with the files that he has selected on the HomeUSB 210. The process then ends, as shown with reference numeral 644. As discussed above, the connection between the HomeUSB 210 and the remote system 340 via the PortableUSB 220 can be maintained as long as desired. The user of the remote system 340 may terminate the connection at any time. Termination may be effected by, for example, using the software provided on the PortableUSB 220, or by removing the PortableUSB 220 from the system 340. Similarly, a user at the host system 330 may terminate the connection.

In a preferred embodiment, the software available on the system 200 allows the system to operate seamlessly with respect to the user. No passwords are required. No login or authentication need be performed by the user. When the HomeUSB 210 and PortableUSB 220 are combined into the system 200, a system software module may be loaded onto the host system 330. The system software module may perform system 200 initialization, and Selected File Set (SFS) selection as discussed above. Similarly, after the system 200 is initialized and the PortableUSB 220 is removed, a HomeUSB software module may be loaded onto the host system 330. This module may perform authentication with the PortableUSB 220, and authorization and transfer of the selected shared files. Additionally, when the PortableUSB 220 is inserted into the remote system 340, a PortableUSB software module may be loaded. This module may perform authentication with the HomeUSB 210, and obtain the shared files previously identified.

There are many alternate applications of the system 200 described above. For example, once the system has been initialized, it is possible to let the PortableUSB serve as the HomeUSB for the original HomeUSB. Effectively, the HomeUSB and PortableUSB switch roles. This enables the user to access files on the PortableUSB while using the HomeUSB. Additionally, it may be possible to use just one hardware module (portable), and replace the HomeUSB with a software module. The user needs to install the virtual HomeUSB module however, and manage it using software. Similarly, it is possible to use a third device such as a mobile phone to serve as the PortableUSB.

As previously discussed, it is also possible to design a system wherein one HomeUSB supports multiple PortableUSBs. It is also possible to chain the device through multiple computers. For example, a single HomeUSB can be attached to a host system, a first Portable USB can be attached to a first remote system, a second PortableUSB can be attached to a second remote system, and the user can then access data on either of the host system or the first remote system from the second remote system. It is understood that multiple variations of the system presented are possible, and all such variations are considered to fall within the scope of the described embodiments.

Some portions of the description above are explicitly or implicitly presented in terms of algorithms and functional or symbolic representations of operations on data within a computer memory, or within the systems 100, 200. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus, such as system 200, host system 330, remote system 340, and remote system 370, for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus, such as, but not limited to systems 100 and 200, to perform the required method steps, may be appropriate. The structure of a conventional general purpose computer will appear from the description below.

In addition, the present specification also implicitly discloses one or more computer programs, in that it would be apparent to the person skilled in the art that the individual steps of the methods described herein may be put into effect by computer code. The various computer programs are not intended to be limited to any particular programming language and implementation thereof. It will be appreciated that a variety of programming languages and coding thereof may be used to implement the teachings of the disclosure contained herein. Moreover, the computer programs are not intended to be limited to any particular control flow. There are many other variants of the computer programs, which can use different control flows, without departing from the spirit or scope of the disclosed embodiments.

Furthermore, one or more of the steps of the computer programs may be performed in parallel rather than sequentially. Such computer programs may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer programs, when loaded and executed on such a general-purpose computer, effectively result in an apparatus that implements the steps of the disclosed methods.

As previously stated, embodiments of the systems 100, 200 may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Figure 7:
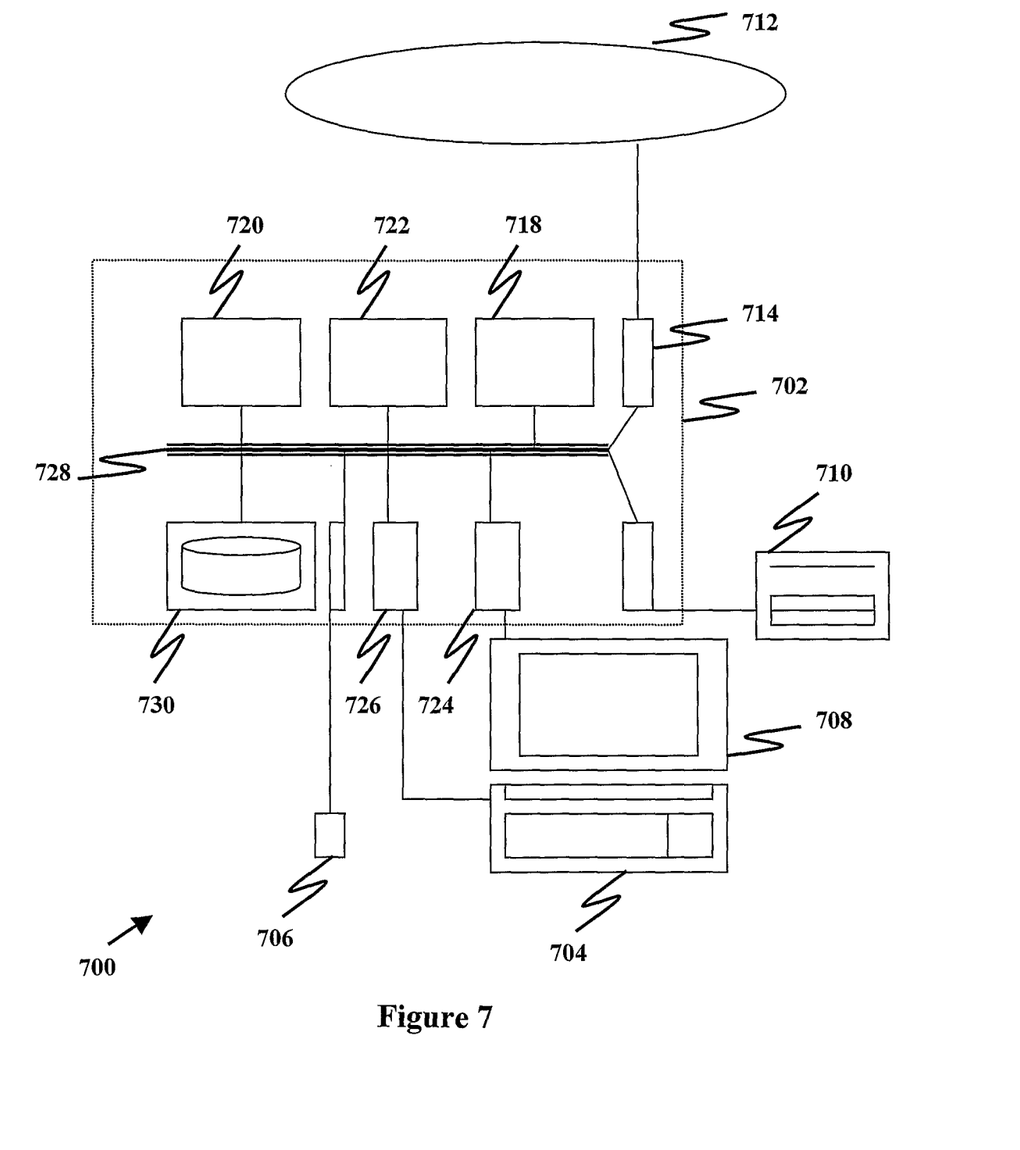
FIG. 7 illustrates one example of a computer system that can be used with the system of FIGS. 1-6.

The host system 330 and remote systems 340, 370 may be similar to a computer system 700, schematically shown in FIG. 7. They may be implemented as software, such as computer programs being executed within the computer system 700, and instructing the computer system 700 to conduct the methods of the example embodiments. Similarly, portions of the computer system 700 may be embodied in the disclosed systems 100, 200.

The computer system 700 can include a computer module 702, input modules such as a keyboard 704 and mouse 706 and a plurality of output devices such as a display 708, and printer 710.

The computer module 702 can be connected to a computer network 712 via a suitable transceiver device 714, to enable access to e.g. the Internet or other network systems such as Local Area Network (LAN) or Wide Area Network (WAN).

The computer module 702 in the example includes a processor 718, a Random Access Memory (RAM) 720 and a Read Only Memory (ROM) 722. The computer module 702 also includes a number of Input/Output (I/O) interfaces, for example I/O interface 724 to the display 708, and I/O interface 726 to the keyboard 704. The components of the computer module 702 typically communicate via an interconnected bus 728 and in a manner known to the person skilled in the relevant art.

The application program can be supplied to the user of the computer system 700 encoded on a data storage medium such as a CD-ROM or flash memory carrier and read utilizing a corresponding data storage medium drive of a data storage device 730. The application program is read and controlled in its execution by the processor 718. Intermediate storage of program data maybe accomplished using RAM 720.

Embodiments of the present invention have several advantages over the prior art. For example, if a user loses the PortableUSB, or if the PortableUSB is stolen, the user can remove the relevant HomeUSB (identified using, for example, the physical markings on the HomeUSB). This prevents the possessor of the PortableUSB from accessing the contents of the host system (contents that were selected for access using the PortableUSB). Since the paired HomeUSB and PortableUSB may be physically identifiable by their colour/physical markings, this step need not involve any software.

Additionally, there might be circumstances in which the user might not have physical access to the host system, e.g. while travelling. The system provides the capability to revoke the system pairing between the HomeUSB and the Portable using the trusted third-party server. When a system pairing is registered with the trusted third-party server (during initialization), the trusted third-party server assigns a unique human-friendly randomly chosen revocation code to the system pairing. The revocation code can be stored separately from the HomeUSB 210 and PortableUSB 220. The user can store the revocation code in various ways, for example, in a mobile phone, computer, trusted third-party server, etc. The revocation code can take different forms. In one embodiment, the user may then send (from a pre-registered mobile number, preferably user's mobile number) this revocation code through SMS to the trusted third-party server. Alternately, a byte string may be sent from a pre-registered email address/chat account. In some embodiments, the user can revoke the system pairing from the remote system. This is possible as long as the user possesses the revocation code to revoke the system pairing.

It is understood that the user is expected to securely store this revocation code, for example, on their mobile phone, etc. When the user detects a loss of the PortableUSB, they can revoke the current system pairing by presenting the revocation code to the trusted third-party server. Once the trusted third-party server has received a revocation code and revoked a system pairing, any fresh requests for the HomeUSB address will not be entertained for that particular system configuration. Similarly, the trusted third-party server may also inform the HomeUSB that the current configuration of the system has been revoked and any file requests should not be entertained. If a thief has already gained access to the host system before the revocation, once a revocation notice has been received, the host system will refuse to entertain requests from the stolen PortableUSB, even though the PortableUSB has already obtained host system's network address.

In other embodiments, the trusted third-party server can also generate a digitally signed list of revoked third-party pairings, similar to a certificate revocation list, and periodically publish it.

One embodiment of the system of the present invention allows a user to insert the system into a standard USB port. As previously discussed, many other alternate connection methods are also available. The user selects (drag and drop, copy) the files that they want to access (from other computers) onto the HomeUSB, just like they would with any USB thumb-drive. Once the "copying" is completed, the user removes the PortableUSB of the system leaving behind the HomeUSB unit on the host computer. The user then carries the PortableUSB to any remote location. At that location, the user inserts the PortableUSB into a standard USB port. The files on the host computer can be seen like files on a regular USB thumb-drive. In a preferred embodiment, no passwords are required. No difficult set-up is necessary. No software is required to be installed by the user. The entire process is performed seamlessly as far as the user is concerned, and the potential for the loss of confidential files is greatly reduced, if not virtually eliminated. All key management functions may be handled automatically by the installed software without user intervention of any kind.

The cryptographic keys can be inserted onto the chips resident in the HomeUSB and PortableUSB. The chips may be tamper resistant. The keys that are generated on these chips never leave the chips. The HomeUSB and PortableUSB may share common external markings that are also coded into the chips. This prevents unauthorized access to data, and confusion for the user who possesses multiple systems. If a PortableUSB is inadvertently paired with an incompatible HomeUSB, the system may be prevented from working. Alternately, the system will work, but all information currently on both the HomeUSB and PortableUSB is deleted, and new keys are generated.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A portable system for accessing data stored on a host system from a remote system using a data link, the system comprising:
   a first hardware device and a second hardware device;
      wherein said first hardware device is capable of being physically connected to both said host system and said second hardware device to associate said first hardware device, said second hardware device and said host system with each other by generating a random master cryptographic key that is stored on each of said first and second hardware devices, and by providing an address of the host system to said second hardware device; and
      wherein said second hardware device is capable of being physically disconnected from said first hardware device and physically connected to said remote system to generate a session key from said master cryptographic key to establish a secure communication channel between said first and second hardware devices across said data link based on the obtained address of the host system to enable the remote system to access said data on the host system, wherein second hardware device and said host system are securely connected with each other using a unique identifier of the host system, and wherein said unique identifier of the host system is at least one identifier selected from a group consisting of a media access control address of said host system, a hard disk identification number of said host system, an internet protocol address of said host system, and a randomly generated pairing, identifier.

2. The system of claim 1, wherein said first and second hardware devices are initially connected to each other, said first hardware device is then connected to said host system.

3. The system of claim 1, wherein said first hardware device connects to said host system using a universal serial bus (USB) connector, and said second hardware device connects to said remote system using a USB connector.

4. The system of claim 1, wherein said data is virtually copied to said first hardware device to provide said data access and said virtually copied data is only available to said remote system when connected to said second hardware device.

5. The system of claim 1, wherein said data link is selected from a group consisting of the internet, a local area network, a wide area network, and a wireless network.

6. The system of claim 2, wherein said data link is routed via a trusted third-party.

7. The system of claim 6, wherein said trusted third-party maintains said unique identifier and uses said unique identifier to complete a data connection between said first and second hardware devices.

8. The system of claim 6, wherein said trusted third-party can revoke the system pairing.

9. A method of accessing data stored on a host system from a remote system using a data link, the method comprising the steps of:
   providing a system comprising a first hardware device and a second hardware device initially physically connected to each other;
   physically connecting said first hardware device of said system to said host system;
   associating said first hardware device, said second hardware device and said host system with each other using a unique identifier of the host system, wherein associating comprises generating a master cryptographic key that is stored on each of said first and second hardware devices, and providing an address of the host system to the second hardware device;
   physically disconnecting said second hardware device from said first hardware device; and
   physically connecting said second hardware device to said remote system to generate a session key from said master cryptographic key to establish a secure communication channel between said first and second hardware devices across said data link to enable the remote system to access said data on the host system, wherein said unique identifier of the host system is at least one identifier selected from a group consisting of a media access control address of said host system, a hard disk identification number of said host system, an internet protocol address of said host system, and a randomly generated long system pairing identifier.

10. The method of claim 9, wherein said master cryptographic key is generated using a random number generator and wherein a cryptographic protocol used for securing the data link between the first hardware device and the second hardware device is selected from a group consisting of symmetric key cryptography, asymmetric key cryptography, and one-time pad cryptography.

11. The method of claim 9, wherein said first and second hardware devices are initially connected to said host system and said remote system using a physical electrical connection.

12. The method of claim 9, wherein:
   said first hardware device comprises a USB, and said first connecting step comprises connecting said USB to said host system; and
   said second hardware device comprises a USB, and said second connecting step comprises connecting said USB to said remote system.

13. The method of claim 9, further comprising a step for virtually copying said data to said first hardware device after said associating step, such that only said virtually copied data is available to said second hardware device.

14. The method of claim 9, wherein said data link is selected from a group consisting of the internet, a local area network, a wide area network, and a wireless network.

15. The method of claim 9, wherein said data link is routed through a trusted third-party.

16. The method of claim 15, wherein said trusted third-party maintains said unique identifier and uses said unique identifier to complete a data connection between said first and second hardware devices.

17. The method of claim 15, wherein said trusted third party can revoke said association between said first hardware device, said second hardware device, and said host system.

* * * * *